(12) United States Patent
Wang et al.

(10) Patent No.: US 11,906,646 B2
(45) Date of Patent: Feb. 20, 2024

(54) METHOD FOR ESTIMATING THE OVER-THE-AIR PROPAGATION DELAY OF DIRECT WAVE

(71) Applicant: SOUTHEAST UNIVERSITY, Nanjing (CN)

(72) Inventors: Haiming Wang, Nanjing (CN); Bensheng Yang, Nanjing (CN); Wenhao Wu, Nanjing (CN)

(73) Assignee: Southeast University, Nanjing (CN)

( * ) Notice: Subject to any disclaimer, the term of this patent is extended or adjusted under 35 U.S.C. 154(b) by 317 days.

(21) Appl. No.: 17/621,688

(22) PCT Filed: Mar. 17, 2021

(86) PCT No.: PCT/CN2021/081351
§ 371 (c)(1),
(2) Date: Dec. 21, 2021

(87) PCT Pub. No.: WO2021/208662
PCT Pub. Date: Oct. 21, 2021

(65) Prior Publication Data
US 2023/0152418 A1 May 18, 2023

(30) Foreign Application Priority Data

Mar. 4, 2021 (CN) .......................... 202110237445.1

(51) Int. Cl.
*G01S 5/02* (2010.01)
(52) U.S. Cl.
CPC .................................. *G01S 5/0273* (2013.01)
(58) Field of Classification Search
CPC .................................................. G01S 5/0273
(Continued)

(56) References Cited

U.S. PATENT DOCUMENTS

2012/0300867 A1* 11/2012 Chen .................... H04B 7/0456
375/267

FOREIGN PATENT DOCUMENTS

| CN | 108933745 | 12/2018 |
| CN | 109379151 | 2/2019 |
| CN | 112083404 | 12/2020 |

OTHER PUBLICATIONS

"Estimation of Underwater Target Motion Parameters Based on Bearing/Multipath Time Delay" Digital Ocean & Underwater Wafare, vol. 3. No. 6. Dec. 15, 2020 (Dec. 15, 2020). ISSN: 2096-5753.

* cited by examiner

*Primary Examiner* — Bo Fan
(74) *Attorney, Agent, or Firm* — Treasure IP Group, LLC

(57) ABSTRACT

The invention discloses a method for estimating the air propagation delay of a direct wave, wherein an azimuth, an elevation angle and a total delay of a multipath wave reaching a receiving end are obtained through a receiving device; a departure angle of a reflected wave is obtained using a geometric relationship of wave reflection; a hypothetical point on a direct wave ray is selected as a transmitting end, and hereby the air propagation delay of the direct wave and the position of a reflection point of the reflected wave are calculated; the propagation delay and distance of the reflected wave are calculated according to the total delay of the direct wave and the reflected wave and the position of the hypothetical point. The invention can obtain the air propagation delay of the direct wave, thereby obtaining a propagation distance of the direct wave and fulfilling the requirements of ranging and positioning.

6 Claims, 3 Drawing Sheets

(58) Field of Classification Search
USPC .......... 342/451, 453, 372, 368, 357.29, 179;
375/267
See application file for complete search history.

METHOD FOR ESTIMATING THE OVER-THE-AIR PROPAGATION DELAY OF DIRECT WAVE

CROSS-REFERENCE TO RELATED APPLICATIONS

This Application is a Section 371 National Stage Application No. PCT/CN2021/081351, filed on Mar. 17, 2021, and claims priority to Chinese Patent Application No. 202110237445.1, filed on Mar. 4, 2021, the contents of which are incorporated herein by reference in their entireties.

1. A method for estimating the air propagation delay of a direct wave, wherein the method comprises the following steps:

Step 1, obtaining a received signal through a radio wave receiving device, and estimating an azimuth of arrival, an elevation angle and a total delay of each path of a multipath wave arriving at a receiving end; the estimated azimuth of arrival, elevation angle and total delay of each path of the multipath wave arriving at the receiving end comprise the azimuth of arrival, elevation angle of arrival, and total delay of arrival ($\varphi_{r,0}$, $\theta_{r,0}$, $\tau_{r,0}$) of the direct wave, and the azimuth of arrival, elevation angle of arrival, and total delay of arrival ($\varphi_{r,1}$, $\theta_{r,1}$, $\tau_{r,1}$) of a reflected wave;

Step 2, obtaining a departure angle of the reflected wave according to the geometric principle of wave reflection and an arrival angle of the reflected wave measured by the radio wave receiving device; the arrival angle of the reflected wave refers to the azimuth of arrival and the elevation angle of arrival of the reflected wave, and the departure angle of the reflected wave refers to the azimuth of departure and the elevation angle of departure of the reflected wave;

Step 3, selecting a hypothetical point on a ray where the arrival angle of the direct wave is located as a transmitting end, and calculating the air propagation delay of the direct wave and the position of a reflection point of the reflected wave at the hypothetical point; the position of the reflection point is determined by the midpoint of a common perpendicular line segment between the ray of the departure angle of the reflected wave and the ray of the arrival angle;

Step 4, calculating a propagation distance of the reflected wave according to the total delay of the direct wave, the total delay of the reflected wave and the position of the selected hypothetical point;

$$l_{sc}=|r_t-r_{sc}|+|r_{sc}-r_p|$$

Where, $l_{sc}$ means the propagation distance of the reflected wave, $r_r$ means the coordinate of the receiving end, $r_{sc}$ means the estimated coordinate of the reflection point of the reflected wave, $r_p$ means the coordinate of the hypothetical point, and $|\cdot|$ means a modulus value;

Step 5, calculating the sum of the distance between the hypothetical point of the transmitting end and the reflection point and the distance between the reflection point and the receiving end, making a difference between the sum and the propagation distance of the reflected wave, and taking an absolute value; selecting the hypothetical point with the smallest absolute value as the position of the transmitting end; calculating the distance between the transmitting end and the receiving end and dividing the distance by the propagation velocity of the radio wave to obtain the estimated value of the air propagation delay of the direct wave;

The path propagation delay when the reflected wave reaches the receiving end is:

$$\tau_{p,1}=\tau_{r,1}-\tau_{r,0}+\tau_{p,0}$$

Where, $\tau_{p,1}$ means the path propagation delay when the reflected wave reaches the receiving end, $\tau_{r,1}$ means the measured total delay of the reflected wave, $\tau_{r,0}$ means the measured total delay of the direct wave, and $\tau_{p,0}$ means the direct path propagation delay from the hypothetical point P of the transmitting end to the receiving end;

The path propagation distance of the reflected wave reaching the receiving end is $l'_{sc}=c\tau_{p,1}$, where c is the propagation velocity of an electromagnetic wave in space;

Choose an appropriate P point position to obtain the smallest cost function:

$$f(r_p)=|l_{sc}-l'_{sc}|$$

Where, $f(r_p)$ means the cost function, $l_{sc}$ means the propagation distance of the reflected wave calculated according to the spatial position coordinate, and $l'_{sc}$ means the propagation distance of the reflected wave calculated according to the calculated path propagation delay when the reflected wave reaches the receiving end;

The estimated value $\hat{\tau}$ of the propagation delay of the direct wave is:

$$\hat{\tau} = \arg\min_{r_p} f(r_p) = \arg\min_{\tau} f(c\tau)$$

Where, $\hat{\tau}$ means the estimated value of the propagation delay of the direct wave, $r_p$ means the distance from a hypothetical transmitting point to the receiving end, and $\tau$ means the propagation delay of the direct wave;

2. The method for estimating the air propagation delay of the direct wave according to claim 1, wherein the azimuth of arrival, the elevation angle and the total delay of each path of the multipath wave arriving at the receiving end are estimated using a joint angle and delay estimation method in step 1;

3. The method for estimating the air propagation delay of the direct wave according to claim 2, wherein the relationship between the arrival angle of the reflected wave and the departure angle of the reflected wave in step 2 is:

$$\begin{cases} \varphi_{r,1} - \varphi_{t,1} = \pi \\ \theta_{r,1} - \theta_{t,1} = 0 \end{cases} \text{ or } \begin{cases} \varphi_{r,1} + \varphi_{t,1} = \pi, 2\pi, 3\pi \\ \theta_{r,1} + \theta_{t,1} = \pi \end{cases}$$

Where, $\varphi_{r,1}$ means the azimuth of arrival of the reflected wave, $\varphi_{t,1}$ means the azimuth of departure of the reflected wave, $\theta_{r,1}$ means the elevation angle of arrival of the reflected wave, and $\theta_{t,1}$ means the elevation angle of departure of the reflected wave;

4. The method for estimating the air propagation delay of the direct wave according to claim 3, wherein a hypothetical point on the ray where the arrival angle of the direct wave is located is selected as the transmitting end in step 3; let the hypothetical point be point P; the distance from the hypothetical point to the receiving end is $r_P$, the receiving end is the origin of coordinates, and the coordinate of the hypothetical point is expressed as:

$$r_P=r_P[\sin\theta_{r,0}\cos\varphi_{r,0}\sin\theta_{r,0}\sin\varphi_{r,0}\cos\theta_{r,0}]$$

Where, $r_P$ means the coordinate of the hypothetical point, $\varphi_{r,0}$ means the azimuth of departure of the direct wave, and $\theta_{r,0}$ means the elevation angle of arrival of the direct wave;

5. The method for estimating the air propagation delay of the direct wave according to claim 4, wherein the method for determining the position of the reflection point by the midpoint of the common perpendicular line segment between the ray of the departure angle of the reflected wave and the ray of the arrival angle in step 3 is as follows: obtain the departure angle ($\varphi_{t,1}$, $\theta_{t,1}$) of the reflected wave and the coordinate $r_r$ of the receiving end according to step 2; then obtain the common perpendicular line segment of the transmitting ray and receiving ray of the reflected wave; finally obtain the midpoint of the common perpendicular line segment, which is recorded as $r_{sc}$, and is the estimated reflection point of the reflected wave;

6. The method for estimating the air propagation delay of the direct wave according to claim 5, wherein the positioning of the transmitting end is completed by setting the position coordinate of the receiving end or taking the receiving end as the origin of coordinates according to the finally obtained propagation delay combined with the arrival angle information of the direct wave measured by the device.

TECHNICAL FIELD

The invention belongs to the technical field of radio positioning, and particularly relates to a method for estimating the air propagation delay of a direct wave with the aid of a reflected wave.

BACKGROUND

A radio wave has the advantages such as stable propagation velocity in a medium, low detection difficulty, etc., so that the radio wave has important applications and great potential in the field of ranging. By multiplying the propagation velocity of the radio wave by the propagation delay, the propagation distance of the radio wave in the medium can be obtained, thereby obtaining the distance between a measuring point and a measured target. Typical ranging equipment includes a radar etc. For a monostatic radar system, the distance obtained by multiplying the detected echo delay by the propagation velocity of the wave in the medium is twice the target distance, thereby measuring the distance between the site and the target. A similar technology is also used in a satellite ranging and positioning system. It can be seen that the ranging using the propagation delay of the radio wave is a widely applied technical means.

An outdoor satellite positioning technology can be implemented smoothly using the propagation delay. With the popularization of a mobile Internet technology, an indoor positioning technology is also demanded to a very large extent. However, the attenuation of electromagnetic wave signals caused by the shielding of buildings makes it difficult to implement the satellite positioning technology indoors, and then there is a need to seek a new ranging and positioning technology. In recent years, thanks to the development of wireless communication technology, the deployment of indoor wireless communication systems has become more and more perfect, and the coverage of indoor wireless communication networks represented by Wireless Local Area Network (WLAN) has been generally completed. Whether in life, office, business or industrial scenes, the layout of wireless communication equipment has been very perfect. Wireless communication equipment meets the user's communication needs while taking into account the position request service meeting the user's needs, which has become an important trend. A key factor in position acquisition is the acquisition of the electromagnetic wave propagation delay. However, in the existing indoor wireless communication scenario, the environment where the receiving end and transmitting end are located is complex, and is also faced with challenges brought by many unfavorable factors such as multi-user requests, network congestion, etc., so that the delay obtained by the equipment includes the response delay of the system in addition to the propagation delay of electromagnetic waves. Therefore, how to remove the response delay of the system and estimate the air propagation time delay of the direct wave has become the key to the indoor positioning and ranging technology.

The current common treatment method is to measure the position of a user terminal through Round Trip Time (RTT). The principle of the method: the time of the receiving side and transmitting side is synchronized, and the receiving and transmitting time difference on the user terminal side is used to subtract the receiving and transmitting time difference on the Access Point (AP) side so as to obtain the signal RTT. However, the problem with this method is that the method calibrates the processing delay of the information on the AP side, but the detection delay of the signal cannot be obtained. The magnitude of the delay still has a non-negligible impact on the small-range ranging and positioning, and will directly affect the accuracy of ranging and the success or failure of positioning.

SUMMARY

Purpose of the invention: The key to a ranging and positioning technology lies in the acquisition of an air propagation delay; the delay of a received signal obtained by using the existing communication equipment as a measurement tool includes a response delay of a system, and the propagation delay of the signal cannot be measured; The invention provides a method for estimating the air propagation time delay of a direct wave; with the aid of reflected wave information, the air propagation delay of the direct wave is estimated and obtained, and then a propagation distance of the direct wave is obtained so as to achieve the needs of ranging and positioning.

Technical schema: In order to achieve the above purpose, the technical scheme adopted by the invention is as follows:

A method for estimating the air propagation delay of a direct wave, wherein the method includes the following steps:

Step 1, obtaining a received signal through a radio wave receiving device, and estimating an azimuth angle of arrival, an elevation angle and a total delay of each path of a multipath wave arriving at a receiving end. The estimated azimuth of arrival, elevation angle and total delay of each path of the multipath wave arriving at the receiving end include the azimuth of arrival, elevation angle of arrival, and total delay of arrival ($\varphi_{r,0}$, $\theta_{r,0}$, $\tau_{r,0}$) of the direct wave, and the azimuth of arrival, elevation angle of arrival, and total delay of arrival ($\varphi_{r,1}$, $\theta_{r,1}$, $\tau_{r,1}$) of a reflected wave.

The azimuth of departure, the elevation angle of departure and the total delay of departure of the reflected wave are expressed as ($\varphi_{t,1}$, $\theta_{t,1}$, $\tau_{t,1}$), and the azimuth of departure, the elevation angle of departure and the total delay of departure of the direct wave are expressed as $(\varphi_{t,0}, \theta_{t,0}, \tau_{t,0})$.

Step 2, obtaining a departure angle of the reflected wave according to the geometric principle of wave reflection and an arrival angle of the reflected wave measured by the radio wave receiving device. The arrival angle of the reflected wave refers to the azimuth of arrival and the elevation angle of arrival of the reflected wave, and the departure angle of the reflected wave refers to the azimuth of departure and the elevation angle of departure of the reflected wave.

Step 3, selecting a hypothetical point on a ray where the arrival angle of the direct wave is located as a transmitting end, and calculating the air propagation delay of the direct wave and the position of a reflection point of the reflected wave at the hypothetical point. The position of the reflection point is determined by the midpoint of a common perpendicular line segment between the ray of the departure angle of the reflected wave and the ray of the arrival angle.

Because of an angle measurement error, the ray of the departure direction of the reflected wave and the ray of the arrival direction are not intersected at a point. In order to smooth the estimation error of the position of the reflection point, the midpoint of the common perpendicular line of the two rays is taken as the position of the reflection point.

The ray of the direction of the arrival angle refers to the ray where the receiving end is taken as the endpoint and the direction is along the direction of the arrival angle; the ray of the direction of the departure angle refers to the ray where the transmitting end is taken as the endpoint and the direction is along the direction of the departure angle.

Step 4, calculating a propagation distance of the reflected wave according to the total delay of the direct wave, the total delay of the reflected wave and the position of the selected hypothetical point.

$l_{sc} = |r_r - r_{sc}| + |r_{sc} - r_p|$

Where, $l_{sc}$ means the propagation distance of the reflected wave, $r_r$ means the coordinate of the receiving end, $r_{sc}$ means the estimated coordinate of the reflection point of the reflected wave, $r_p$ means the coordinate of the hypothetical point, and $|\cdot|$ means a modulus value.

Step 5, calculating the sum of the distance between the hypothetical point of the transmitting end and the reflection point and the distance between the reflection point and the receiving end, making a difference between the sum and the propagation distance of the reflected wave, and taking an absolute value; selecting the hypothetical point with the smallest absolute value as the position of the transmitting end; calculating the distance between the transmitting end and the receiving end and dividing the distance by the propagation velocity of the radio wave to obtain the estimated value of the air propagation delay of the direct wave.

The path propagation delay when the reflected wave reaches the receiving end is:

$\tau_{p,1} = \tau_{r,1} - \tau_{r,0} + \tau_{p,0}$

Where, $\tau_{p,1}$ means the path propagation delay when the reflected wave reaches the receiving end, $\tau_{r,1}$ means the measured total delay of the reflected wave, $\tau_{r,0}$ means the measured total delay of the direct wave, and $\tau_{p,0}$ means the direct path propagation delay from the hypothetical point P of the transmitting end to the receiving end.

The path propagation distance of the reflected wave reaching the receiving end is $l'_{sc} = c\tau_{p,1}$, where c is the propagation velocity of an electromagnetic wave in space.

Choose an appropriate P point position to obtain the smallest cost function:

$f(r_p) = |l_{sc} - l'_{sc}|$

Where, $f(r_p)$ means the cost function, $l_{sc}$ means the propagation distance of the reflected wave calculated according to the spatial position coordinate, and $l'_{sc}$ means the propagation distance of the reflected wave calculated according to the calculated path propagation delay when the reflected wave reaches the receiving end.

The estimated value $\hat{\tau}$ of the propagation delay of the direct wave is:

$$\hat{\tau} = \arg\min_{r_p} f(r_p) = \arg\min_{\tau} f(c\tau)$$

Where, $\hat{\tau}$ means the estimated value of the propagation delay of the direct wave, $r_p$ means the distance from a hypothetical transmitting point to the receiving end, and $\tau$ means the propagation delay of the direct wave.

In step 3, a suitable hypothetical point is selected as the transmitting end to meet the requirements of the minimum distance difference in step 5 of the process. This process can be regarded as an optimization process.

Preferably, the azimuth angle of arrival, the elevation angle and the total delay of each path of the multipath wave arriving at the receiving end are estimated using the joint angle and delay estimation method in step 1.

Preferably, the relationship between the arrival angle of the reflected wave and the departure angle of the reflected wave in step 2 is:

$$\begin{cases} \varphi_{r,1} - \varphi_{t,1} = \pi \\ \theta_{r,1} - \theta_{t,1} = 0 \end{cases} \text{ or } \begin{cases} \varphi_{r,1} + \varphi_{t,1} = \pi, 2\pi, 3\pi \\ \theta_{r,1} + \theta_{t,1} = \pi \end{cases}$$

Where, $\varphi_{r,1}$ means the azimuth of arrival of the reflected wave, $\varphi_{t,1}$ means the azimuth of departure of the reflected wave, $\theta_{r,1}$ means the elevation angle of arrival of the reflected wave, and $\theta_{t,1}$ the elevation angle of departure of the reflected wave.

Preferably, a hypothetical point on the ray where the arrival angle of the direct wave is located is selected as the transmitting end in step 3; let the hypothetical point be point P; the distance from the hypothetical point to the receiving end is $r_P$, the receiving end is the origin of coordinates, and the coordinate of the hypothetical point is expressed as:

$r_P = r_P[\sin\theta_{r,0}\cos\varphi_{r,0} \sin\theta_{r,0}\sin\varphi_{r,0} \cos\theta_{r,0}]$ Where, $r_P$ means the coordinate of the hypothetical point, $\varphi_{r,0}$ means the azimuth of departure of the direct wave, and $\theta_{r,0}$ means the elevation angle of arrival of the direct wave.

Preferably, the method for determining the position of the reflection point by the midpoint of the common perpendicular line segment between the ray of the departure angle of the reflected wave and the ray of the arrival angle in step 3 is as follows: obtain the departure angle $(\varphi_{t,1}, \theta_{t,1})$ of the reflected wave and the coordinate $r_r$ of the receiving end according to step 2; then obtain the common perpendicular line segment of the transmitting ray and receiving ray of the reflected wave; finally obtain the midpoint of the common perpendicular line segment, which is recorded as $r_{sc}$, and is the estimated reflection point of the reflected wave.

Preferably, the positioning of the transmitting end is completed by setting the position coordinate of the receiving end or taking the receiving end as the origin of coordinates according to the finally obtained propagation delay combined with the arrival angle information of the direct wave measured by the device.

Compared with the prior art, the invention has the following beneficial effects:

For an existing indoor wireless communication system, the acquisition of the air propagation delay is a huge challenge, which also brings a difficulty to indoor positioning and ranging. The existing indoor wireless positioning scheme uses multiple APs to work together, and the positioning of an indoor terminal is achieved through the time difference between the arrivals of a signal at different APs. This positioning scheme requires multiple APs to achieve synchronization and work at the same time. For some scenarios where a terminal to multiple APs is under line-of-sight propagation conditions at the same time, this scheme will fail. Therefore, only using a single receiving end to achieve indoor positioning has important practical significance. The invention can complete the estimation of the air propagation delay of the direct wave under the condition that only one AP to the terminal is in line-of-sight propagation and only the receiving end needs to work, so the invention has extremely important value for indoor positioning and ranging.

DETAILED DESCRIPTION

According to the drawings and specific embodiments, the invention is further described below. In this specific embodiment, the receiving end is a receiver with a direction finding function, and the transmitting end is a device transmitting a signal with a specific format and a certain bandwidth. In this embodiment, the arrival angle and signal delay of an electromagnetic wave are obtained through a direction-finding antenna array at the receiving end. It should be understood that these embodiments are only used to illustrate the invention instead of limiting the scope of the invention. After reading the invention, various equivalent forms of modifications of the invention by those skilled in the art fall within the scope defined by the claims appended to this application.

A method for estimating the air propagation delay of a direct wave, wherein the known conditions required to estimate the propagation delay include an arrival angle of the direct wave and the arrival angle of a reflected wave at the receiving end and a total delay experienced by a signal; the information can be obtained by means of a joint angle and delay estimation algorithm, including the following steps.

Figure 1:
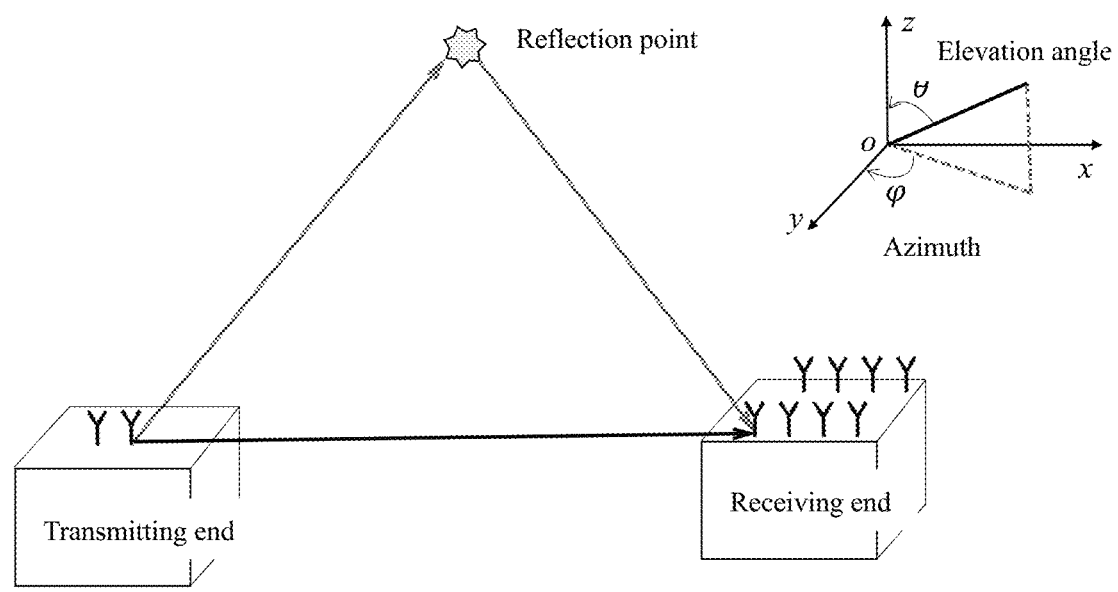
FIG. 1 The definition of the parameters of the direct wave and reflected wave including the departure angle and the arrival angle.

Step 1, obtaining a received signal through a radio wave receiving device, and estimating an azimuth angle of arrival, an elevation angle and the total delay of each path of a multipath wave arriving at the receiving end. As shown in FIG. 1, the total delay includes two parts such as the air propagation delay of the radio wave and a system response delay, and the process of estimating the system response delay from the total delay is the main process of the invention.

The azimuth angle of arrival, the elevation angle and the total delay of each path of the multipath wave arriving at the receiving end are estimated using the joint angle and delay estimation method. The estimated azimuth of arrival, elevation angle and total delay of each path of the multipath wave arriving at the receiving end include the azimuth of arrival, elevation angle of arrival, and total delay of arrival ($\varphi_{r,0}$, $\theta_{r,0}$, $\tau_{r,0}$) of the direct wave, and the azimuth of arrival, elevation angle of arrival, and total delay of arrival ($\varphi_{r,1}$, $\theta_{r,1}$, $\tau_{r,1}$) of the reflected wave.

Definition: the azimuth of departure, the elevation angle of departure and the total delay of departure of the reflected wave are expressed as ($\varphi_{t,1}$, $\theta_{t,1}$, $\tau_{t,1}$), and the azimuth of departure, the elevation angle of departure and the total delay of departure of the direct wave are expressed as ($\varphi_{t,0}$, $\theta_{t,0}$, $\tau_{t,0}$).

The reflected wave refers to a single reflected wave. In the same coordinate system, when the surface of a wave reflector is secularly reflected, the departure angle of an incident wave and the arrival angle of the reflected wave show a specific algebraic relationship.

Step 2, obtaining the departure angle of the reflected wave according to the geometric principle of wave reflection and the arrival angle of the reflected wave measured by the radio wave receiving device. The arrival angle of the reflected wave refers to the azimuth of arrival and the elevation angle of arrival of the reflected wave, and the departure angle of the reflected wave refers to the azimuth of departure and the elevation angle of departure of the reflected wave. The departure angle of the reflected wave is obtained according to the relationship between the arrival angle of the reflected wave and the departure angle of the reflected wave:

$$\begin{cases} \varphi_{r,1} - \varphi_{t,1} = \pi \\ \theta_{r,1} - \theta_{t,1} = 0 \end{cases} \text{ or } \begin{cases} \varphi_{r,1} + \varphi_{t,1} = \pi, 2\pi, 3\pi \\ \theta_{r,1} + \theta_{t,1} = \pi \end{cases} \qquad (1)$$

Where, $\varphi_{r,1}$ means the azimuth of arrival of the reflected wave, $\varphi_{t,1}$ means the azimuth of departure of the reflected wave, $\theta_{r,1}$ the elevation angle of arrival of the reflected wave, and $\theta_{t,1}$ means the elevation angle of departure of the reflected wave.

It can be seen that after the direction-finding device obtains the arrival angle of the reflected wave, the departure angle will also be limited to a certain combination range, so that the possibility of a limited set of departure angles can be obtained. Traverse all the departure angles, and select the departure angle leading to the shortest distance of the common perpendicular line between the ray of the departure angle of the reflected wave and the ray of the arrival angle as the true departure angle of the reflected wave. The ray of the arrival angle of the reflected wave refers to the ray extending in the direction of the arrival angle with the receiving end as the endpoint. The departure angle meeting formula (1) may have no common perpendicular line with the ray of the arrival angle. When the true departure angle is selected, the departure angle corresponding to this case can be directly excluded.

Figure 2:
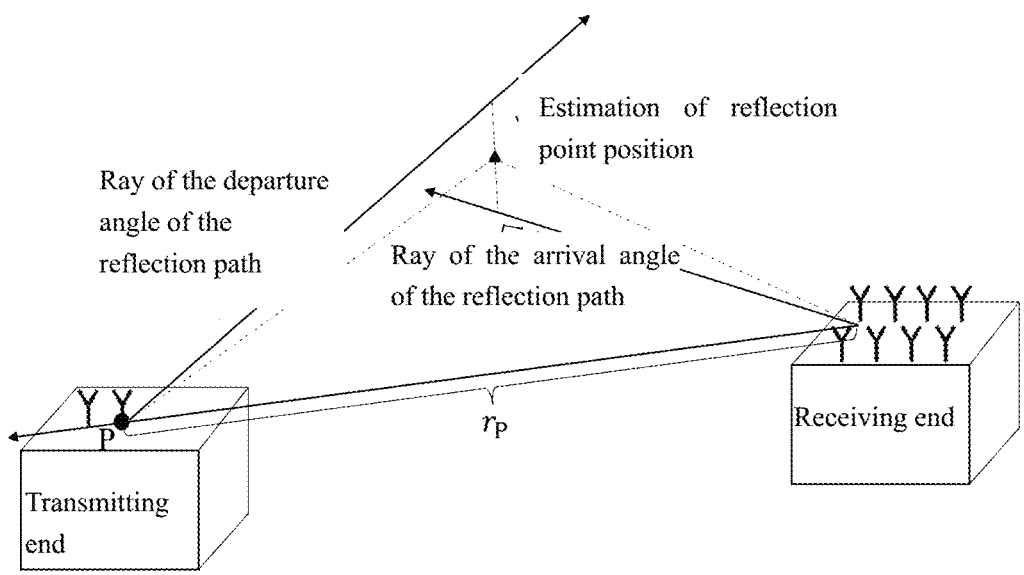
FIG. 2 Hypothetical point selection and reflection point position estimation model.

Step 3, as shown in FIG. 2, selecting a hypothetical point on the ray where the arrival angle of the direct wave is located as the transmitting end, and calculating the air propagation delay of the direct wave and the position of a reflection point of the reflected wave at the hypothetical point. The position of the reflection point is determined by the midpoint of a common perpendicular line segment between the ray of the departure angle of the reflected wave and the ray of the arrival angle.

The hypothetical point is selected as the transmitting end, and the propagation time from the position of the hypothetical point to the position of the receiving end does not exceed the total delay estimated in the receiving device. Let the hypothetical point be point P; the distance from the hypothetical point to the receiving end is $r_P$, the receiving end is the origin of coordinates, and the coordinate of the P point is expressed as:

$$r_P = r_P[\sin\theta_{r,0}\cos\varphi_{r,0}\ \sin\theta_{r,0}\sin\varphi_{r,0}\ \cos\theta_{r,0}] \quad (2)$$

Where, $r_P$ means the coordinate of the P point, $\varphi_{r,0}$ means the azimuth of departure of the direct wave, and $\theta_{r,0}$ means the elevation angle of arrival of the direct wave.

According to step 2, the departure angle $(\varphi_{r,1}, \theta_{r,1})$ of the reflected wave and the coordinate $r_r$ of the receiving end can be obtained; here, you can define the coordinate of the receiving end as $r_r$, and then the common perpendicular line segment between the transmitting ray of the reflected wave and the receiving ray can be obtained using the estimated arrival angle $(\varphi_{r,1}, \theta_{r,1})$ and the known coordinate of the receiving end; finally, the midpoint of the common perpendicular line segment is obtained, which is recorded as $r_{sc}$, and is the estimated reflection point of the reflected wave.

The departure angle of the reflected wave can be filtered to a finite set according to the algebraic relationship in formula (2). Then calculate the length of the common perpendicular line segment of the straight line before and after reflection of the reflected wave, and select the angle that can minimize the corresponding common perpendicular line as the departure angle of the reflected wave.

Step 4, the reflection path is composed of a connecting line of the receiving end, the reflection point and the transmitting end. After selecting the hypothetical point as the transmitting end, the position of the reflection point is obtained. Using the known position of the receiving end, the propagation distance of the reflected wave can be calculated as follows:

$$l_{sc} = |r_r - r_{sc}| + |r_{sc} - r_p| \quad (3)$$

Where, $l_{sc}$ means the propagation distance of the reflected wave, and |·| means a modulus value.

Step 5, calculating the sum of the distance between the hypothetical point of the transmitting end and the reflection point and the distance between the reflection point and the receiving end, making a difference between the sum and the propagation distance of the reflected wave, taking an absolute value, and selecting the hypothetical point with the smallest absolute value as the position of the transmitting end; calculating the distance between the transmitting end and the receiving end and dividing the distance by the propagation velocity of the radio wave to obtain the estimated value of the air propagation delay of the direct wave.

Let the propagation delay of the direct path from the hypothetical point P at the transmitting end to the receiving end be $\tau_{p,0}$. Based on the principle that the direct wave and the reflected wave start from the transmitting end at the same time and arrive at the receiving end at different times, it is not difficult to calculate the path propagation delay of the reflected wave reaching the receiving end as follows:

$$\tau_{p,1} = \tau_{r,1} - \tau_{r,0} + \tau_{p,0} \quad (4)$$

Where, $\tau_{p,1}$ means the path propagation delay when the reflected wave reaches the receiving end, $\tau_{r,1}$ means the measured total delay of the reflected wave, $\tau_{r,0}$ means the measured total delay of the direct wave, and $\tau_{p,0}$ means the direct path propagation delay from the hypothetical point P of the transmitting end to the receiving end.

The path propagation distance of the reflected wave reaching the receiving end is $l'_{sc} = c\tau_{p,1}$, where c is the propagation velocity of an electromagnetic wave in space.

Choose an appropriate P point position to obtain the smallest cost function:

$$f(r_p) = |l_{sc} - l'_{sc}| \quad (5)$$

Where, $f(r_p)$ means the cost function, $l_{sc}$ means the propagation distance of the reflected wave calculated according to the spatial position coordinate, and $l'_{sc}$ means the propagation distance of the reflected wave calculated according to the calculated path propagation delay when the reflected wave reaches the receiving end.

Figure 3:
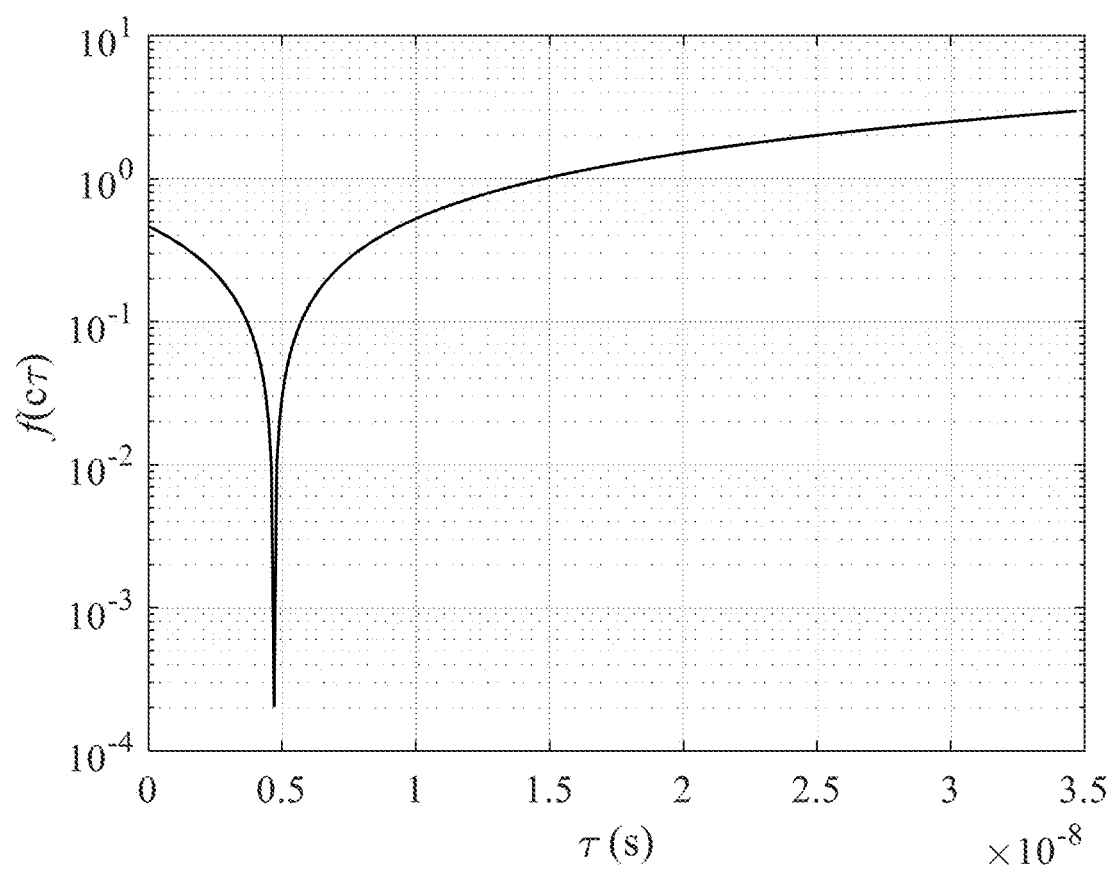
FIG. 3 Estimated result of the optimal hypothetical point.

FIG. 3 shows the estimated result of the optimal hypothetical point.

The estimated value $\hat{\tau}$ of the propagation delay of the direct wave is:

$$\hat{\tau} = \arg\min_{r_p} f(r_p) = \arg\min_{\tau} f(c\tau) \quad (6)$$

Where, $\hat{\tau}$ means the estimated value of the propagation delay of the direct wave, $r_p$ means the distance from a hypothetical transmitting point to the receiving end, and $\tau$ means the propagation delay of the direct wave.

The invention is not limited to radio waves, and is also applicable to acoustic waves. The invention is used in the fields of positioning and ranging etc.

The above is only a preferred embodiment of the invention. It should be pointed out that as far as a person of ordinary skill in the art is concerned, the person may implement some improvements and modifications on the premise of following the principle of the invention; however, such improvements and modifications shall be deemed to be within the coverage of protection of the invention.

The invention claimed is:

1. A method for estimating the air propagation delay of a direct wave, comprising
   1) obtaining a received signal through a radio wave receiving device, and estimating an azimuth of arrival, an elevation angle and a total delay of each path of a multipath wave arriving at a receiving end; the estimated azimuth of arrival, elevation angle and total delay of each path of the multipath wave arriving at the receiving end comprise the azimuth of arrival, elevation angle of arrival, and total delay of arrival $(\varphi_{r,0}, \theta_{r,0}, \tau_{r,0})$ of the direct wave, and the azimuth of arrival, elevation angle of arrival, and total delay of arrival $(\varphi_{r,1}, \theta_{r,1}, \tau_{r,1})$ of a reflected wave;
   2) obtaining a departure angle of the reflected wave according to the geometric principle of wave reflection and an arrival angle of the reflected wave measured by the radio wave receiving device; the arrival angle of the reflected wave refers to the azimuth of arrival and the elevation angle of arrival of the reflected wave, and the departure angle of the reflected wave refers to the azimuth of departure and the elevation angle of departure of the reflected wave;
   3) selecting a hypothetical point on a ray where the arrival angle of the direct wave is located as a transmitting end, and calculating the air propagation delay of the direct wave and the position of a reflection point of the reflected wave at the hypothetical point; the position of the reflection point is determined by the midpoint of a common perpendicular line segment between the ray of the departure angle of the reflected wave and the ray of the arrival angle;
   4) calculating a propagation distance of the reflected wave according to the total delay of the direct wave, the total delay of the reflected wave and the position of the selected hypothetical point;

$$l_{sc}=|r_r-r_{sc}|+|r_{sc}-r_p|$$

wherein, $l_{sc}$ means the propagation distance of the reflected wave, $r_r$ means the coordinate of the receiving end, $r_{sc}$ means the estimated coordinate of the reflection point of the reflected wave, $r_p$ means the coordinate of the hypothetical point, and |·| means a modulus value;

5) calculating the sum of the distance between the hypothetical point of the transmitting end and the reflection point and the distance between the reflection point and the receiving end, making a difference between the sum and the propagation distance of the reflected wave, and taking an absolute value; selecting the hypothetical point with the smallest absolute value as the position of the transmitting end; calculating the distance between the transmitting end and the receiving end and dividing the distance by the propagation velocity of the radio wave to obtain the estimated value of the air propagation delay of the direct wave;

the path propagation delay when the reflected wave reaches the receiving end is:

$$\tau_{p,1}=\tau_{r,1}-\tau_{r,0}+\tau_{p,0}$$

wherein, $\tau_{p,1}$ means the path propagation delay when the reflected wave reaches the receiving end, $\tau_{r,1}$ means the measured total delay of the reflected wave, $\tau_{r,0}$ means the measured total delay of the direct wave, and $\tau_{p,0}$ means the direct path propagation delay from the hypothetical point P of the transmitting end to the receiving end;

the path propagation distance of the reflected wave reaching the receiving end is $l'_{sc}=c\tau_{p,1}$, where c is the propagation velocity of an electromagnetic wave in space;

choose an appropriate P point position to obtain the smallest cost function:

$$f(r_p)=|l_{sc}-l'_{sc}|$$

wherein, $f(r_p)$ means the cost function, $l_{sc}$ means the propagation distance of the reflected wave calculated according to the spatial position coordinate, and $l'_{sc}$ means the propagation distance of the reflected wave calculated according to the calculated path propagation delay when the reflected wave reaches the receiving end;

an estimated value $\hat{\tau}$ of the propagation delay of the direct wave is:

$$\hat{\tau} = \arg\min_{r_p} f(r_p) = \arg\min_{\tau} f(c\tau)$$

wherein, $\hat{\tau}$ means the estimated value of the propagation delay of the direct wave, $r_p$ means the distance from a hypothetical transmitting point to the receiving end, and $\tau$ means the propagation delay of the direct wave.

2. The method for estimating the air propagation delay of the direct wave according to claim 1, wherein the azimuth of arrival, the elevation angle and the total delay of each path of the multipath wave arriving at the receiving end are estimated using a joint angle and delay estimation method in step 1).

3. The method for estimating the air propagation delay of the direct wave according to claim 2, wherein the relationship between the arrival angle of the reflected wave and the departure angle of the reflected wave in step 2) is:

$$\begin{cases} \varphi_{r,1} - \varphi_{t,1} = \pi \\ \theta_{r,1} - \theta_{t,1} = 0 \end{cases} \text{ or } \begin{cases} \varphi_{r,1} + \varphi_{t,1} = \pi, 2\pi, 3\pi \\ \theta_{r,1} + \theta_{t,1} = \pi \end{cases}$$

wherein, $\varphi_{r,1}$ means the azimuth of arrival of the reflected wave, $\varphi_{t,1}$ means the azimuth of departure of the reflected wave, $\theta_{r,1}$ the elevation angle of arrival of the reflected wave, and $\theta_{t,1}$ means the elevation angle of departure of the reflected wave.

4. The method for estimating the air propagation delay of the direct wave according to claim 3, wherein a hypothetical point on the ray where the arrival angle of the direct wave is located is selected as the transmitting end in step 3; let the hypothetical point be point P; the distance from the hypothetical point to the receiving end is $r_P$, the receiving end is the origin of coordinates, and the coordinate of the hypothetical point is expressed as:

$$r_P = r_P[\sin\theta_{r,0}\cos\varphi_{r,0} \sin\theta_{r,0}\sin\varphi_{r,0} \cos\theta_{r,0}]$$

Where, $r_P$ means the coordinate of the hypothetical point, $\varphi_{r,0}$ means the azimuth of departure of the direct wave, and $\theta_{r,0}$ means the elevation angle of arrival of the direct wave.

5. The method for estimating the air propagation delay of the direct wave according to claim 4, wherein the method for determining the position of the reflection point by the midpoint of the common perpendicular line segment between the ray of the departure angle of the reflected wave and the ray of the arrival angle in step 3 is as follows: obtain the departure angle $(\varphi_{t,1}, \theta_{t,1})$ of the reflected wave and the coordinate $r_r$ of the receiving end according to step 2; then obtain the common perpendicular line segment of the transmitting ray and receiving ray of the reflected wave; finally obtain the midpoint of the common perpendicular line segment, which is recorded as $r_{sc}$, and is the estimated reflection point of the reflected wave.

6. The method for estimating the air propagation delay of the direct wave according to claim 5, wherein the positioning of the transmitting end is completed by setting the position coordinate of the receiving end or taking the receiving end as the origin of coordinates according to the finally obtained propagation delay combined with the arrival angle information of the direct wave measured by the device.

* * * * *